(12) United States Patent
Sutterlin

(10) Patent No.: US 9,008,193 B2
(45) Date of Patent: Apr. 14, 2015

(54) POWER LINE COMMUNICATION DEVICE THAT IS RESILIENT TO CROSS-BAND INTERFERENCE

(71) Applicant: Philip H. Sutterlin, Saratoga, CA (US)

(72) Inventor: Philip H. Sutterlin, Saratoga, CA (US)

(73) Assignee: Echelon Corporation, San Jose, CA (US)

( * ) Notice: Subject to any disclaimer, the term of this patent is extended or adjusted under 35 U.S.C. 154(b) by 4 days.

(21) Appl. No.: 13/843,882

(22) Filed: Mar. 15, 2013

(65) Prior Publication Data

US 2014/0269950 A1    Sep. 18, 2014

(51) Int. Cl.
| | |
|---|---|
| H04L 25/00 | (2006.01) |
| H03M 3/00 | (2006.01) |
| H04B 3/32 | (2006.01) |
| H04B 3/54 | (2006.01) |

(52) U.S. Cl.
CPC ... *H04B 3/32* (2013.01); *H04B 3/54* (2013.01)

(58) Field of Classification Search
CPC .................... H04K 25/0272; H04K 25/0292
USPC ................. 375/257, 332, 345; 341/143, 155; 327/308, 12
See application file for complete search history.

(56) References Cited

U.S. PATENT DOCUMENTS 7,769,122 B2 *    8/2010    Sato et al. ...................... 375/375
8,462,030 B2 *    6/2013    Muhammad .................. 341/143

OTHER PUBLICATIONS

P1901.2/D0.07.00 Draft Standard for Low Frequency (less than 500 kHz) Narrow Band Power Line Communications for Smart Grid Applications, IEEE Standards Draft, Nov. 2012, 337 pages.
Signalling on low-voltage electrical installations in the frequency range 3 kHz to 148,5 kHz—, Part 1: General requirements, frequency bands and electromagnetic disturbances, BSI Standards Publication, BS EN 50065-1:2011, Apr. 2011, 36 pages.
Interconnection of information technology equipment—Control Network Protocol—Part 3: Power line channel specification, ISO/IEC 14908-3:2010(E), Jun. 2010, 19 pages.
Series G: Transmission Systems and Media, Digital Systems and Networks, Access networks—In premises networks, Narrowband orthogonal frequency division multiplexing power line communication transceivers for ITU-T G.hnem networks, Telecommunication Standardization Sector of ITU, Recommendation ITU-T G.9902, Oct. 2012, 170 pages.

(Continued)

*Primary Examiner* — Khai Tran
(74) *Attorney, Agent, or Firm* — Blakely, Sokoloff, Taylor & Zafman LLP

(57) ABSTRACT

A Power Line Communication (PLC) device that is resilient to cross-band interference. The PLC device is configured to communicate on AC power wiring in the frequency range of 9 kilohertz to 500 kilohertz and does not use automatic gain control prior to analog-to-digital conversion. The PLC device includes an over-sampled analog-to-digital converter with a sample clock of at least 10 megahertz and includes a loop filter that maintains a noise power spectral density that does not exceed three decibels above a minimum noise floor, of the noise power spectral density, at 80 kilohertz or above, and a digital filter and decimator configured to remove quantization noise, where a decimation factor of the decimator is such that it provides an output decimation rate between 350 kilohertz and 1.6 megahertz.

20 Claims, 12 Drawing Sheets

(56) References Cited

OTHER PUBLICATIONS

Series G: Transmission Systems and Media, Digital Systems and Networks, Access networks—In premises networks, Narrowband orthogonal frequency division multiplexing power line communication transceivers for G3-PLC networks, Telecommunication Standardization Sector of ITU, Recommendation ITU-T G.9903, Oct. 2012, 186 pages.

Series G: Transmission Systems and Media, Digital Systems and Networks, Access networks—In premises networks, Narrowband orthogonal frequency division multiplexing power line communication transceivers for Prime networks, Telecommunication Standardization Sector of ITU, Recommendation ITU-T G.9904, Oct. 2012, 200 pages.

Power Line Telecommunications (PLT) Narrow band transceivers in the range 9 kHz to 500 kHz Power Line Performance Test Method Guide, Technical Specification, ETSI TS 103 909 V1.1.1, Dec. 2012, 56 pages.

* cited by examiner

710→

.define IIRZ g*((b2*Z^2+b1*Z+b0)/(a2*Z^2-a1*Z+a0))*((bb2*Z^2+bb1*Z+bb0)/(aa2*Z^2-aa1*Z+aa0))
.define b2 0.375
.define b1 0.375
.define b0 0.375
.define a2 1.0
.define a1 0.4375
.define a0 0.671875
.define bb2 0.375
.define bb1 0.25
.define bb0 0.375
.define aa2 1.0
.define aa1 0.4375
.define aa0 0.625
.define g 1.31

.define IIRZ g*(b2*Z^2+b1*Z+b0)/(a2*Z^2-a1*Z+a0)
.define b2 0.25
.define b1 0.3125
.define b0 0.25
.define a2 1.0000
.define a1 0.875
.define a0 0.65625
.define g 1.0

FIG. 8

POWER LINE COMMUNICATION DEVICE THAT IS RESILIENT TO CROSS-BAND INTERFERENCE

FIELD

Embodiments of the invention relate to the field of Power Line Communication (PLC); and more specifically to PLC devices that are resilient to cross-band interference.

BACKGROUND

Prior to the 1990s, power line communication devices were either built entirely with analog signal processing circuitry (e.g., power line based intercoms and baby monitors) or they were built with analog filtering followed by digital detection circuitry (e.g., X-10 devices).

In the early 1990s, the first power line communication devices to incorporate digital signal processing (DSP) for filtering and related receive functions were introduced. The architecture of these early DSP based devices is illustrated in FIG. 1. Typical DSP based power line transceivers use the same basic architecture as illustrated in FIG. 1.

FIG. 1 illustrates high-pass filters 110 and low-pass filters 115, which in some cases are implemented as a band-pass filter, followed by an automatic gain control (AGC) amplifier 120. The purpose of the initial high-pass filtering is to effectively remove any AC mains voltage (e.g., 50 or 60 Hz power frequencies), while also attenuating low-frequency mains noise that is below the communication band. The purpose of the low-pass filtering is to prevent aliasing products from later analog-to-digital conversion (ADC).

The initial filtering is followed by the functionality of the AGC amplifier 120. The AGC amplifier 120 selects the highest available gain to provide high sensitivity to reception of weak signals when there is little noise after processing by the initial high and low-pass filters. The AGC amplifier 120 also avoids saturation of the ADC when significant noise remains, after initial filtering, by selecting a lower gain setting in that instance.

The detector 125 determines when the AGC gain can be maximized without overload and sets it accordingly. The detector 125 also determines when residual noise levels are such that a lower gain setting must be selected in order to avoid overload, and thus selects a lower gain/lower sensitivity setting. The output of the AGC amplifier 120 is then fed to the ADC 130. The digital output of the ADC 130 is then fed to a DSP block 135 for higher selectivity filtering, and other receiver processing.

A table showing the AGC gain range and ADC equivalent number of bits (ENOB) for several current state-of-the-art power line communication devices is shown in Table 1. As used herein, ENOB is defined to be (SNR−1.76)/6.02, where SNR is the ratio of signal power to noise power expressed in decibels. When there is very little noise on the channel and the AGC is set to a higher gain value, these devices can receive data packets that have been attenuated by 65 to 90 dB relative to a full scale transmitted signal prior to channel attenuation.

TABLE 1

|  | Supplier A | Supplier B | Supplier C |
| --- | --- | --- | --- |
| AGC gain range (dB) | 62 | 30 | 18 |
| ADC ENOB (bits) | ~10 | ~10 | ~11 |
| Sensitivity (on quiet channel in dBFS) | ~80 | ~65 | ~80 |

A limitation of the architecture of FIG. 1 is manifest when large amplitude signals exist on the power mains that are adjacent to the communication band (this is sometimes referred to as cross-band interference). In this case these large amplitude signals cause the AGC gain to be set to a lower value, reducing the sensitivity of the receiver to recovery of intended receive signals that have been attenuated by the communication channel. In this case the receiver must use of a lower gain setting, thereby impairing its ability to recover attenuated messages. The described limitation is illustrated with the frequency domain plots of FIG. 2. As seen in the frequency domain plot 200, the attenuated incoming packet 210 is accompanied by a strong "other" signal 215. This strong "other" signal causes the AGC gain of the AGC amplifier 120 to be set low. As a result, and as seen in the frequency domain plot 205, the intended packet 210 is lost below the ADC noise floor 220.

The case illustrated in FIG. 2 is becoming increasingly common. Regulatory norms in European Committee for Electrotechnical Standardization (CENELEC) countries divide the power line spectrum below 148.5 kHz into multiple bands. CENELEC standard EN 50065-1 references "A-band, B-band, C-band and D-band to designate the frequency bands 3 kHz to 95 kHz, 95 kHz to 125 kHz, 125 kHz to 140 kHz and 140 kHz to 148.5 kHz respectively". In CENELEC countries, EN50065-1 specifies that the A-band " . . . shall only be used for applications for monitoring or controlling the low-voltage distribution network . . . " while the B, C and D-bands are available for applications either within homes, commercial or industrial premises. In addition, EN50065-1 specifies that the B through D bands may also be used for, "Control and monitoring equipment installed on or connected to the low-voltage distribution network external to premises."

When the spectrum is divided such that multiple users attempt simultaneous communication on the same distribution wiring in adjacent frequency bands, this results in situations where the above described limitation occurs. One example of such a situation is when an electric utility utilizes the A-band to communicate between each electricity meter and a data concentrating device located near the associated mains distribution transformer, while the C-band is used for communication from, or near, the electricity meter to other locations within the serviced home or commercial establishment. It is not uncommon for messages sent by a data concentrating device to be attenuated by 60 to 80 dB by the time they arrive at an electricity meter. At the same time a C-band device that is located very near the electricity meter may be transmitting a full strength signal directly adjacent to the electricity meter. With prior art architectures such as illustrated in FIG. 1 the electricity meter would be unable to recover the attenuated A-band message from the data concentrator because the nearby C-band signal is forcing the A-band receiver to a low-gain/low-sensitivity state. This is precisely the case illustrated in FIG. 2.

Another, example where the prior art architecture of FIG. 1 becomes a limiting factor is when street lighting devices that employ C-band communication share the same distribution wiring as A-band Smart Grid devices. When an A-band and C-band device are located adjacent to each other the presence of a strong transmission signal from one results in the other having reduced sensitivity and missing attenuated messages due to the AGC amplifier entering a low gain state. Note that even though the target receiver may have higher selectivity filtering inside the DSP unit, that does not resolve the problem since the AGC amplifier gain must still be lowered to avoid distortion that would spread the C-band signal into the A-band making it unrecoverable within the DSP. Note that it is generally not practical or economical to provide very high selectivity filtering ahead of the AGC amplifier as a means to improve adjacent channel selectivity.

It is not only adjacent band intentional communications that can cause an AGC amplifier to select a low-gain/low-sensitivity setting. Certain devices that are connected to the AC mains have emissions large enough to cause the same effect.

The above described limitation of prior art power line communication devices is not limited to those operating in CENELEC countries. In the United States, power line communication is permitted below 535 kHz and Federal Communications Commission (FCC) regulations do not impose any division of the mains communication spectrum into different bands. Most existing and emerging international industry standards have elected to adhere to the same CENELEC band structure, except in some instances allowing of another band from approximately 150 kHz to approximately 500 kHz. Examples of these standards include:

ITU-T G.9902 Narrow-band orthogonal frequency division multiplexing power line communication transceivers for ITU-T G.hnem networks ITU-T G.9903 Narrow-band orthogonal frequency division multiplexing power line communication transceivers for G3-PLC networks ITU-T G.9904 Narrow-band orthogonal frequency division multiplexing power line communication transceivers for PRIME networks ISO/IEC 14908-3 Information technology—Control network protocol Part 3: Power line channel specification P1901.2/D0.07.00 Draft Standard for Low Frequency (less than 500 kHz) Narrow Band Power Line Communications for Smart Grid Applications As more power line communication devices are deployed in conformance to the above standards the problem of a device transmitting in one band causing a nearby device to be unable to receive an attenuated signal in an adjacent band will increase.

High performance audio ADC technology typically operates with sample rates between 44.1 and 192 k samples per second with 16 to 20 ENOB in a 20 kHz bandwidth. High performance audio ADC technology commonly employs a form of sigma-delta modulator (SDM) (also known as Delta-Sigma Modulators or over-sampled analog to digital converters) which converts its input signal to a very small number of bits (e.g., 1 to 5 bit width stream) at a multi-megahertz sample rate. The small bit-width of the modulator results in high noise levels, but the noise is spread across a band that is much wider than the audio band of 20 Hz to 20 kHz.

Audio SDMs further shape this quantization noise spectra to minimize it in the band below 20 kHz, while allowing it to grow above the audio band. As a result, the noise density increases above the audio band where the noise is less harmful. This is accomplished with a modulator loop gain that remains high to 20 kHz and diminishes above the audio band (high loop gain results in quantization noise being minimized while frequencies with lower loop gain allow the noise error to increase). A digital filter and decimator are then employed in such a way to filter out quantization noise (as well as other signals) above the audio band.

BRIEF DESCRIPTION OF THE DRAWINGS

The invention may best be understood by referring to the following description and accompanying drawings that are used to illustrate embodiments of the invention. In the drawings:

FIG. 7 shows an exemplary filter used in the digital filter and decimator of FIG. 6 according to one embodiment;

FIG. 8 shows an alternative filter used in the digital filter and decimator of FIG. 6 according to another embodiment;

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An improved power line communication (PLC) device that is resilient to cross-band interference is described herein. For example, the improved PLC device is able to receive a highly attenuated signal when there is another strong signal present at the receiver in an adjacent frequency band. Unlike typical PLC devices, the improved PLC device does not use automatic gain control (AGC) functionality prior to the analog-to-digital conversion. In order to compensate for the lack of sensitivity that would otherwise have been provided by the AGC amplifier, the improved PLC device uses an over-sampled analog-to-digital converter (ADC) with a sample clock of at least ten megahertz with a loop filter that maintains a noise power spectral density that is no more than three decibels above the minimum noise floor, of the noise power spectral density, at 80 kilohertz or above; and a digital filter and decimator that removes quantization noise that has been shaped to be substantially outside the communication band of interest (e.g., A-band, B-band, C-band, and/or D-band), where the decimation factor is selected to provide an output decimation rate between 350 kilohertz and 1.6 megahertz.

Figure 3:
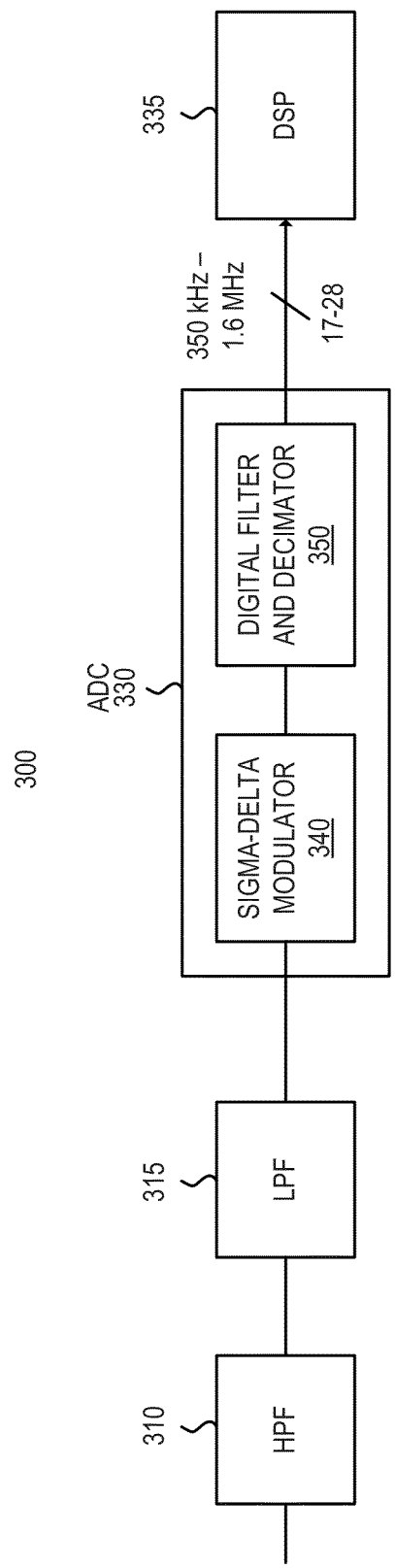
FIG. 3 is a block diagram illustrating one embodiment of an improved PLC device that is able to receive a highly attenuated signal when there is another strong signal present at the receiver in an adjacent frequency band according to one embodiment.

FIG. 3 is a block diagram illustrating one embodiment of the improved PLC device 300 that is resilient to cross-band interference according to one embodiment. The PLC device 300 communicates on AC power wiring in the frequency range of 9 to 500 kilohertz and the receiver does not use an automatically adjusted gain function prior to analog-to-digital conversion.

The analog signal is processed through the high-pass filters 310 and the low-pass filters 315, which in some cases are implemented as a band-pass filter, and which is optional in some embodiments. Similar to typical PLC devices, the high-pass filtering effectively removes any AC mains voltage (e.g., 50 or 60 Hz power frequencies), while also attenuating low-frequency mains noise that is below the communication band; and the low-pass filtering prevents aliasing products from later analog-to-digital conversion.

Figure 1:
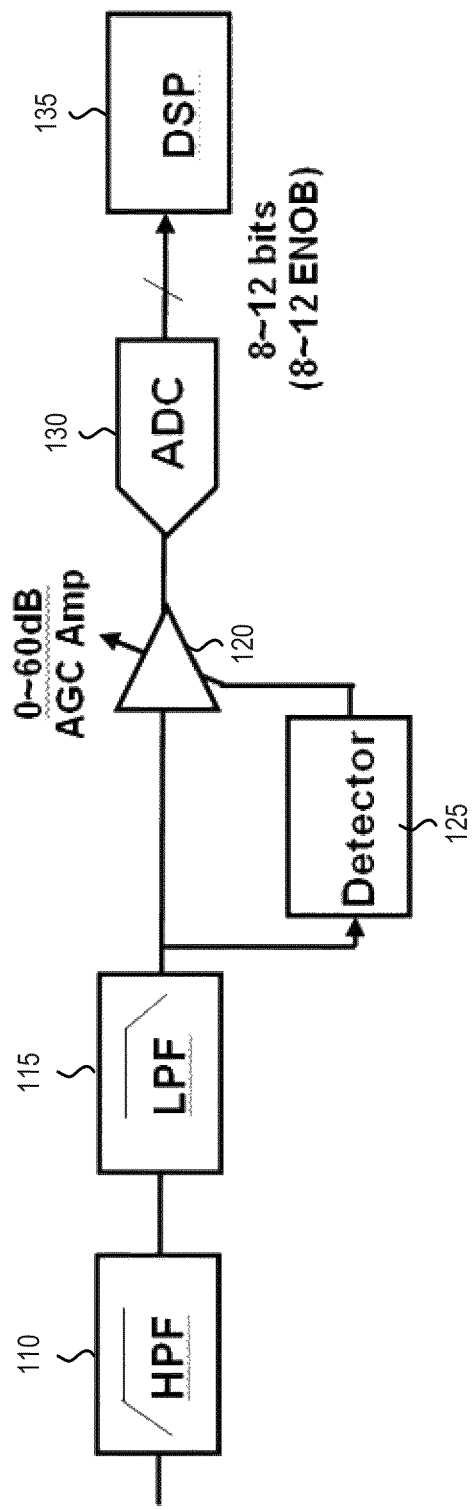
FIG. 1 illustrates an architecture of an exemplary prior art power line communication device.
Figure 2:
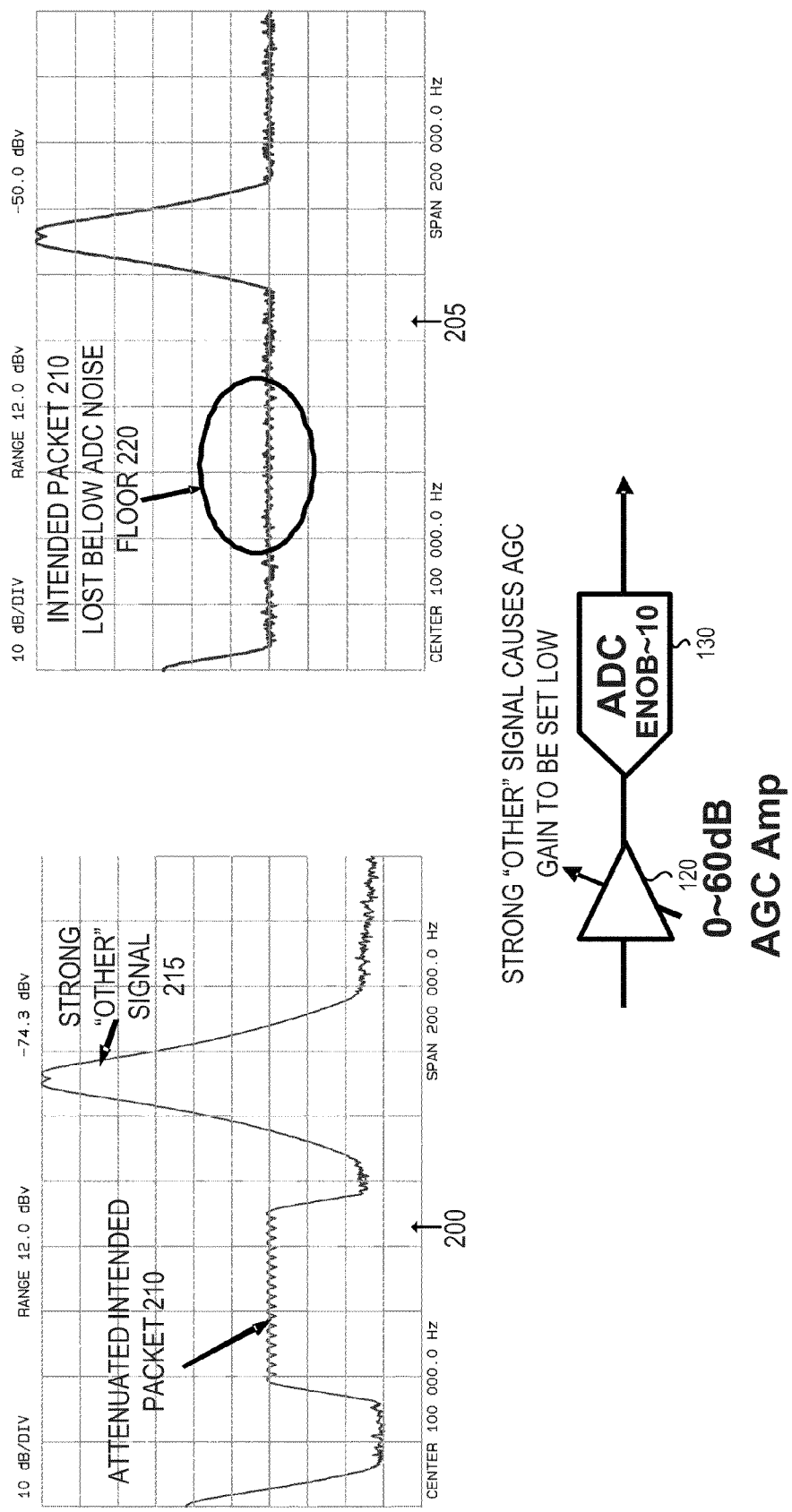
FIG. 2 illustrates a scenario where the prior art power line communication devices are unable to receive a highly attenuated signal when there is another strong signal present at the receiver in an adjacent frequency band.

Unlike typical PLC devices that include an AGC amplifier, such as the prior art PLC device architecture illustrated in FIG. 1, the improved PLC device 300 does not include an AGC amplifier prior to the analog-to-digital conversion. Eliminating this AGC functionality causes there to be no change in the noise floor presented to the digital signal processing (DSP) unit 335 when receiving weak signals in the presence of strong adjacent channel signals. Eliminating the AGC functionality also eliminates bit errors that frequently occur when an AGC amplifier gain is in transition.

However, eliminating the AGC functionality without taking any additional action would result in a constant higher noise floor in the DSP and thus reduced sensitivity even when no adjacent channel interference exists. By way of example, to compensate for the benefits lost by the absence of the AGC amplifier, an ADC with a 350 kilohertz to 1.6 megahertz output sample rate and approximately 100 decibels SNR per 3 kilohertz would be required (approximately 17 ENOB).

To compensate for the reduced sensitivity caused by the absence of the AGC amplifier, the ADC 330 of the improved PLC device 300 includes a sigma-delta modulator (SDM) 340 ADC and digital filter and decimator 350 (an SDM in combination with a digital filter and decimator is one of a class of devices also known as over-sampled ADCs). The SDM 340 converts its input signal (from the low-pass filter 315 as illustrated in FIG. 3) to one or more bits (e.g., 1 to 5 bit width stream) at a multi-megahertz sample rate. In one embodiment, the ADC 330 has a sample clock of 10 megahertz or more. The loop transfer function of the sigma-delta modulator 340 is such that its loop gain remains relatively flat to several hundred kilohertz before rolling off. As a result, the quantization noise can be kept low enough can be kept low enough to achieve 100 dB dynamic range per 3 kHz in the communication band of power line signals. For example, the loop filter 410 maintains a noise power spectral density that is no more than 3 decibels above the minimum noise floor, of the noise power spectral density, at 80 kilohertz or above.

The ADC 330 includes a digital filter and decimator 350 that removes quantization noise that has been shaped to be substantially outside the communication band of interest (e.g., A-band, B-band, C-band, and/or D-band) according to one embodiment. The decimation factor for the digital filter and decimator 350 is such that it provides an output decimation rate between 350 kilohertz and 1.6 megahertz according to one embodiment.

The digital output of the ADC 330 is then fed to the DSP block 335 for higher selectivity filtering and other receiver processing. In one embodiment, the DSP block 335 is coupled with the digital filter and decimator 350 with a 17 to 28 input bit width. In one embodiment, the ADC 330 is a modified form of an ADC that is typically used in audio applications.

In one embodiment, the PLC 300 is compliant with one or more of the following standards: European Committee for Electrotechnical Standardization (CENELEC) standard EN 50065-1; International Telecommunication Union Telecommunication Standardization Sector (ITU-T) G.9902; ITU-T G.9903; ITU-T G.9904; International Organization for Standardization/International Electrotechnical Commission (ISO/IEC) 14908-3; and Institute of Electrical and Electronics Engineers (IEEE) P1901.2/D0.07.00.

Figure 4:
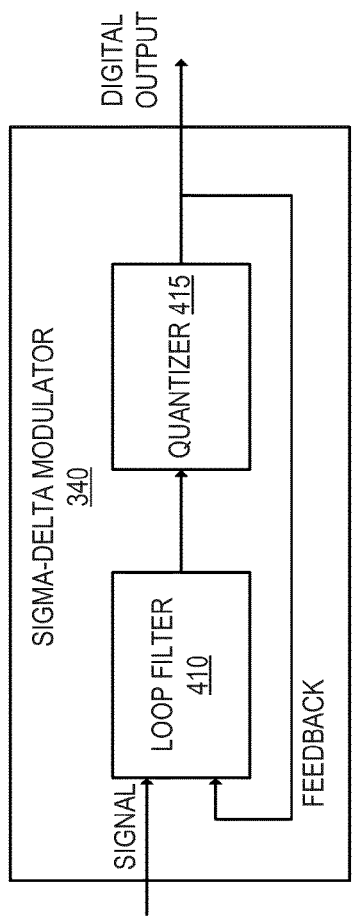
FIG. 4 is a block diagram of an exemplary architecture of a sigma-delta modulator that can be used in the improved PLC device of FIG. 3 according to one embodiment.

FIG. 4 is a block diagram of the architecture of the sigma-delta modulator 340 according to one embodiment. As illustrated in FIG. 4, the sigma-delta modulator 340 includes the loop filter 410 and the quantizer 415. In one embodiment, the loop filter 410 is a $3^{rd}$ order filter (thus the sigma-delta modulator 340 is considered to be a $3^{rd}$ order SDM). The loop filter 410 is selected such that the noise corner at the SDM output is between 80 and 500 kilohertz. The loop filter 410 compares the input signal with the quantized output signal that is fed back into the loop filter 410. The differences between these two signals is frequency weighed with the loop filter 410. The result of the weighing is passed to the quantizer 415 that generates the digital output that is fed back into the loop filter 410.

Figure 5:
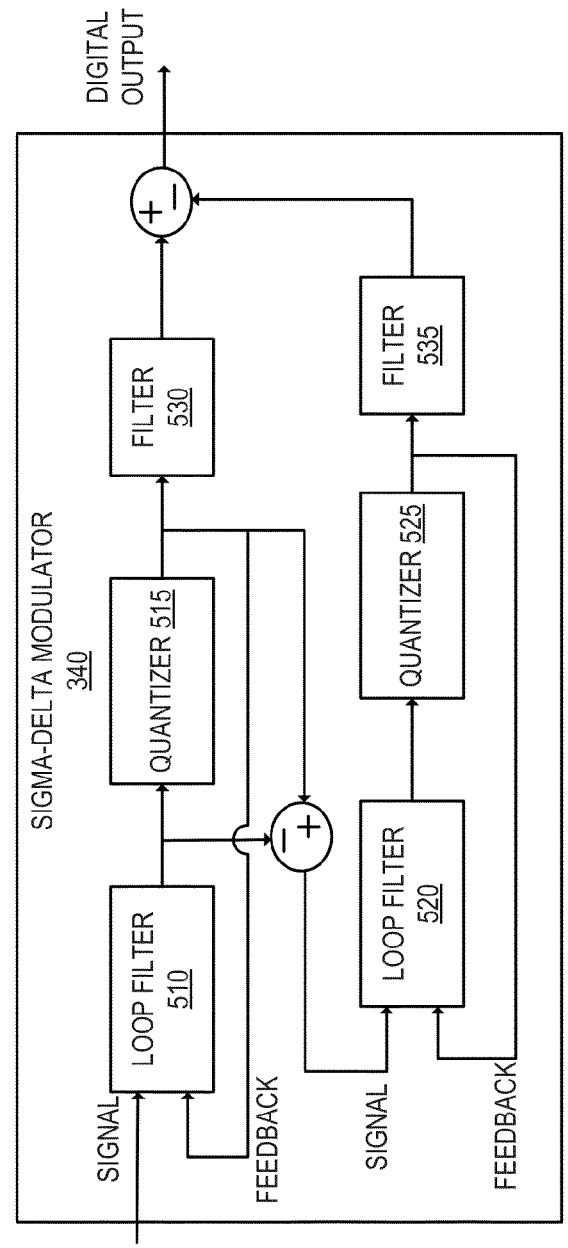
FIG. 5 is a block diagram of an exemplary architecture of a multi-stage noise shaping (MASH) sigma-delta modulator that can be used in the improved PLC device of FIG. 3 according to one embodiment.

FIG. 5 is a block diagram of an alternative architecture of the sigma-delta modulator 340 according to one embodiment. As an alternative to the single-loop SDM described with reference to FIG. 4, the architecture illustrated in FIG. 5 includes a cascade of first-order SDMs, which is commonly referred to as a multi-stage noise shaping (MASH) structure. As illustrated in FIG. 5, the loop filter 510 compares the input signal with the quantized output signal that is fed back into the loop filter 510 from the quantizer 515. The loop filter 510 compares the input signal with the quantized output signal that is fed back into the loop filter 510. The differences between these two signals is frequency weighed with the loop filter 510. The result of the weighing is passed to the quantizer 515 that generates the digital output that is fed back into the loop filter 510. The quantization error of the first modulator is converted by the loop filter 520 and quantizer 525. The two results are weighed with the filters 530 and 535 such that the quantization noise of the first stage modulator is exactly canceled and only the shaped noise of the second stage modulator remains. In one embodiment, the loop filters 510 and 520 are selected such that the 3 decibel noise corner is between 80 and 500 kilohertz.

Figure 6:
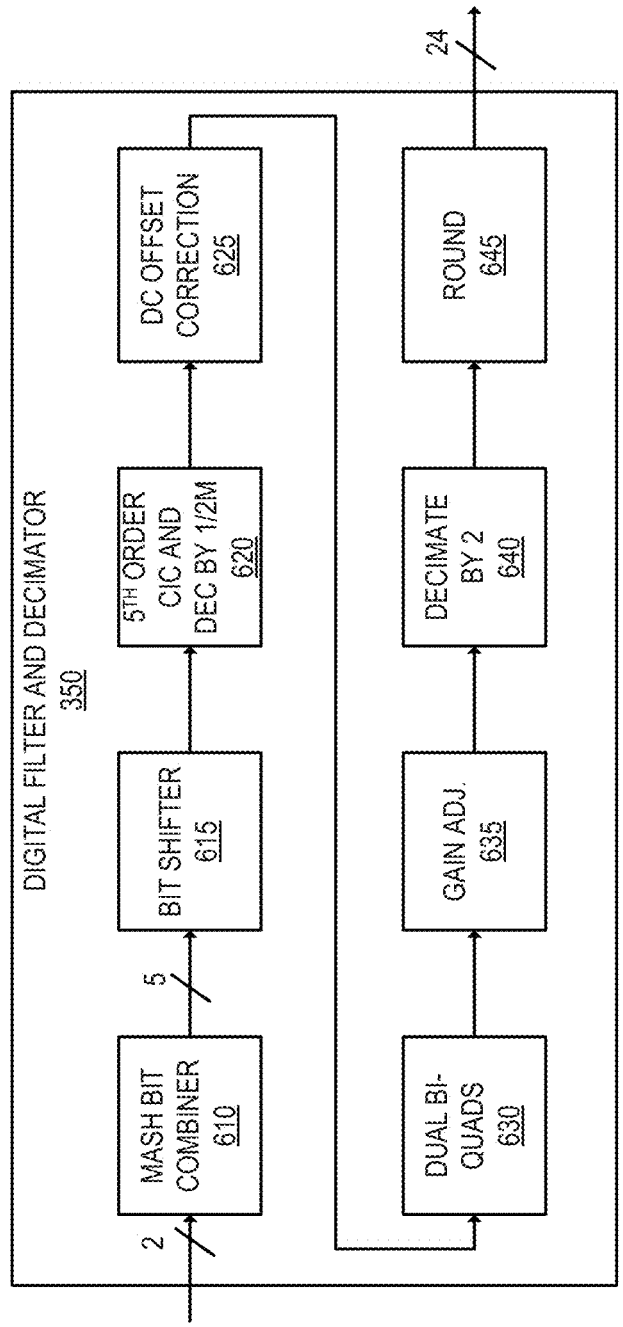
FIG. 6 is a block diagram of an exemplary digital filter and decimator of the improved PLC device of FIG. 3 according to one embodiment.

FIG. 6 is a block diagram of an exemplary digital filter and decimator 350 that may be used in some embodiments. The digital filter and decimator 350 illustrated in FIG. 6 may be used in combination with the MASH SDM architecture illustrated in FIG. 5. The MASH bit combiner 610 combines the two bit output from the MASH SDM illustrated in FIG. 5 such that the quantization noise of the first stage modulator is exactly canceled and only the shaped noise of the second stage modulator remains thereby creating a 5 bit quantity at the SDM clock rate. The bit shifter 615 adjusts the magnitude of the signal entering the next stage of the decimator by allowing bit shifting which adjusts the signal level in 6 decibel steps. The 5th order cascaded integrator-comb (CIC) and DEC by ½m 620 block is a filter that decimates by half the ultimately desired decimation factor for the overall decimation block. The DC offset correction 625 is a high pass filter with a −3 decibel corner of approximately 4 kilohertz.

The Dual Bi-Quads 630 provides peaking compensation for the in-band frequency response roll-off of the CIC filter. The Dual Bi-Quads 630 is different from what is commonly used in the art to compensate for in-band CIC filter roll-off. Typically a finite impulse response (FIR) filter is used for this purpose; however FIR filters consume a lot of resources (e.g., gates and power) and thus a 4th order infinite impulse response (IIR) filter is implemented as the dual bi-quads in this embodiment. Depending on the particular power line standard that the device is set to receive, in one embodiment either the filter 710 illustrated in FIG. 7 is used or the filter 810 illustrated in FIG. 8 is used.

The gain adjust 635 is a 5-bit digital multiplier that can adjust the gain of the digital signal between 0.25 and 1.875. The decimate by 2 block 640 decimates the signal by 2. The round block 645 rounds a wider bit stream down to a 24 bit quantity for input to the DSP (e.g., the DSP 335, which may be a 24-bit DSP).

Although the digital filter and decimator illustrated in FIG. 6 was described in relation with the MASH SDM architecture illustrated in FIG. 5, a similar architecture of a digital filter and decimator may be used in the SDM architecture of FIG. 4, with the exception of omitting the MASH bit combiner 610.

Figure 9:
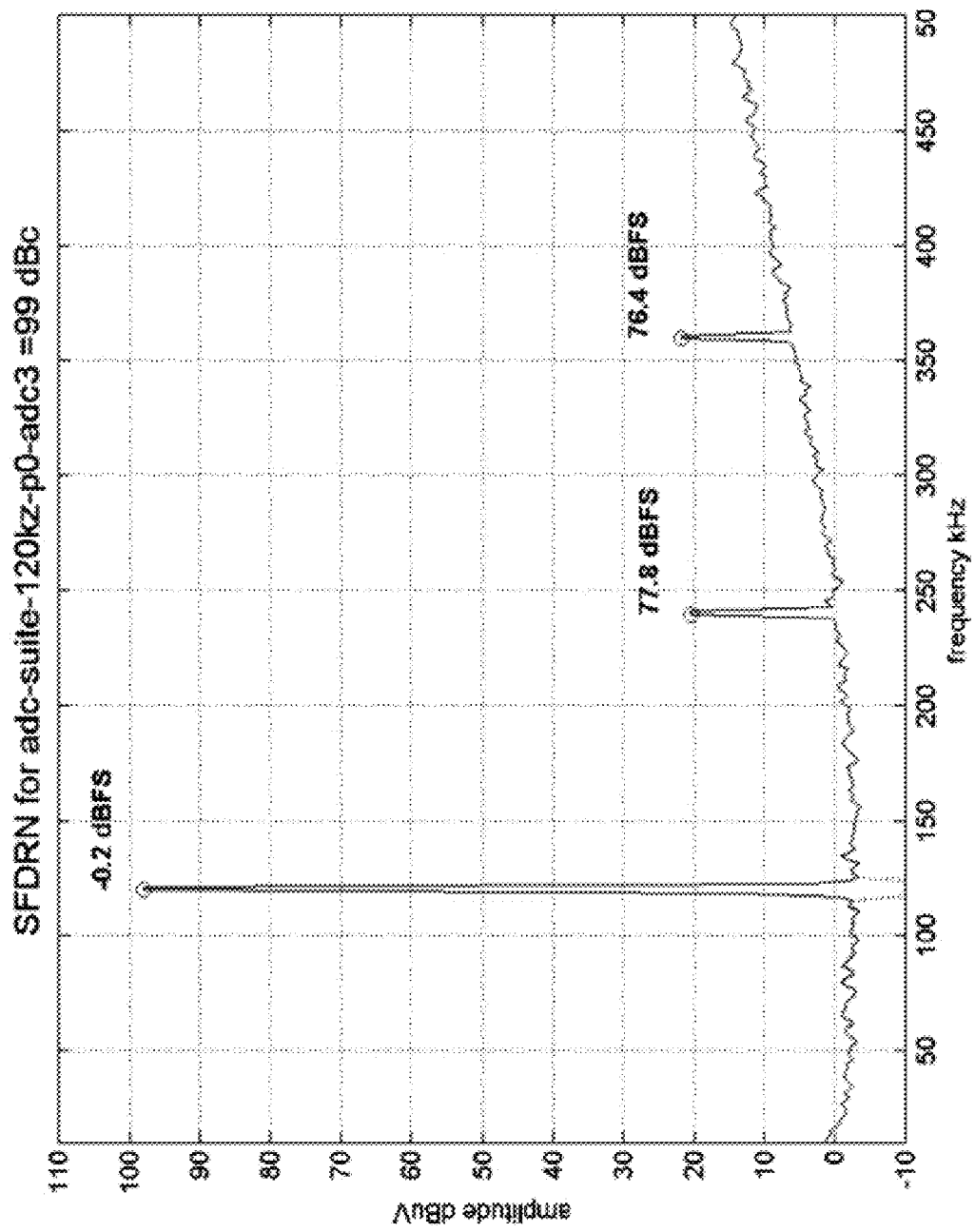
FIG. 9 illustrates a spectral plot showing 100 decibel per 3 kilohertz dynamic range using a third order SDM (e.g., an SDM having the architecture described with respect to FIG. 4) with a 0 decibels relative to full scale (dBFS) input at 120 kilohertz.

FIG. 9 illustrates a spectral plot showing 100 decibel per 3 kilohertz dynamic range using a third order SDM (e.g., an SDM having the architecture described with respect to FIG. 4) with a 0 decibels relative to full scale (dBFS) input at 120 kilohertz. As illustrated in the spectral plot, the noise is approximately −100 dBFS to 200 kilohertz. The 3 dB noise corner is approximately 250 kilohertz.

Figure 10:
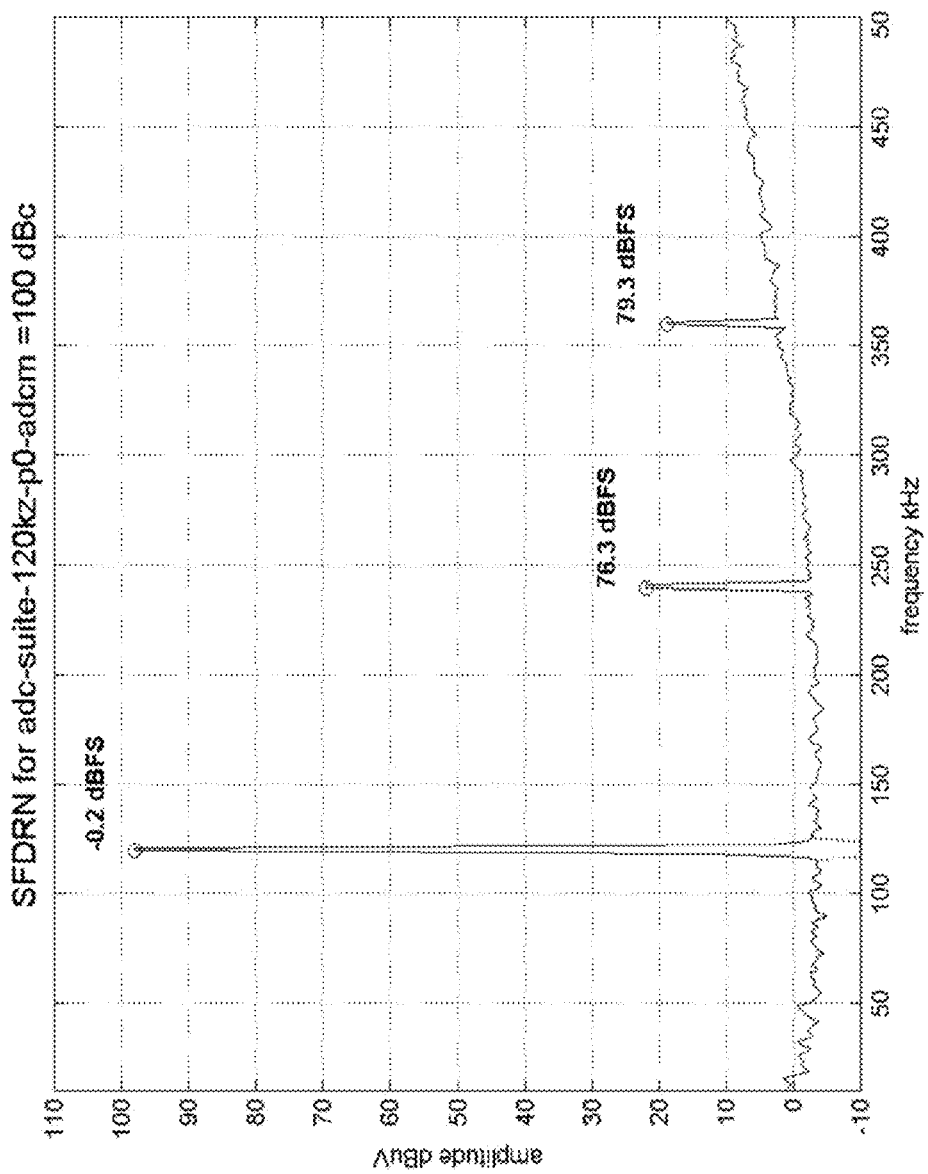
FIG. 10 illustrates a spectral plot showing 100 decibel per 3 kilohertz dynamic range using a MASH SDM (e.g., an SDM having the architecture described with respect to FIG. 5) with a 0 dBFS input at 120 kilohertz.

FIG. 10 illustrates a spectral plot showing 100 decibel per 3 kilohertz dynamic range using a MASH SDM (e.g., an SDM having the architecture described with respect to FIG. 5) with a 0 dBFS input at 120 kilohertz. As illustrated in the spectral plot, the noise is approximately −100 dBFS to 250 kilohertz. The 3 dB noise corner is approximately 300 kilohertz.

In one embodiment, the decimation factors may be programmable thereby allowing a single device to communicate using a variety of communication standards. Table 2, shown below, indicates the ADC modulator clock rates, decimation factors, and decimation output sample rates for different power line communication standards according to one embodiment.

TABLE 2

| Example use | $F_{SDMCLK}$ (Hz) | Decimation Factor | $f_{DECOUT}$ (Hz) |
| --- | --- | --- | --- |
| P1901.2, and G.hnem A-band devices | 40,000,000 | 100 | 400,000 |
| 14908-3 | 40,000,000 | 76 | 526,316 |
| P1901.2, and G.hnem FCC-band devices | 38,400,000 | 32 | 1,200,000 |
| P1901.2, and G.hnem A-band devices | 38,400,000 | 96 | 400,000 |
| Legacy-A | 39,321,600 | 114 | 344,926 |
| G.hnemFCC-band | 38,400,000 | 24 | 1,600,000 |

A technical specification published by the European Technical Standards Institute (ETIS) reinforces the value of receiving a weak intended signal while a stronger unintended signal in an adjacent frequency band is present. This specification is ETSI TS 103 909 Power Line Telecommunications (PLT) Narrow band transceivers in the range 9 kHz to 500 kHz Power Line Performance Test Method Guide. This specification describes test for Link Budget which effectively measures the ability of a device to recover weak signals under a variety of circumstances. Link budget is defined in this ETSI specification as follows: "The link budget is a measure of how much signal attenuation (in dB) can be present between a transmitter and receiver such that a specified level of successful message delivery is achieved." "The link budget for a device is first measured without any interference, and is measured again separately with each of the four classes of interference." One of the four classes of interference defined in the ETSI specification is Intentional Communicators. The link budget with Intentional Communicators is an indicator of whether a device suffers from the limitation of prior art techniques.

Table 3 (below) shows the AGC gain range, ADC ENOB, sensitivity, and ETSI International communicator link budget results for three current state-of-the-art PLC devices (from Suppliers A-C) as well as a PLC device according to an embodiment of the invention (e.g., having an architecture similar to that illustrated in FIG. 5.

TABLE 3

|  | Supplier A | Supplier B | Supplier C | Embodiment of the present invention |
| --- | --- | --- | --- | --- |
| AGC gain range (dB) | 62 | 30 | 18 | None |
| ADC ENOB (bits) | ~10 | ~10 | ~11 | ~17 |
| Sensitivity (on quiet channel in dBFS) | ~80 | ~65 | ~80 | ~80 |
| ETSI Intentional communicator link budget (dB) | 40 | 40 | 45 | 66 |

As can be seen from the results in Table 3, the embodiment of the present invention is able to receive 20 dB weaker signals in the presences of adjacent channel strong signals when compared to prior art techniques.

Figure 11:
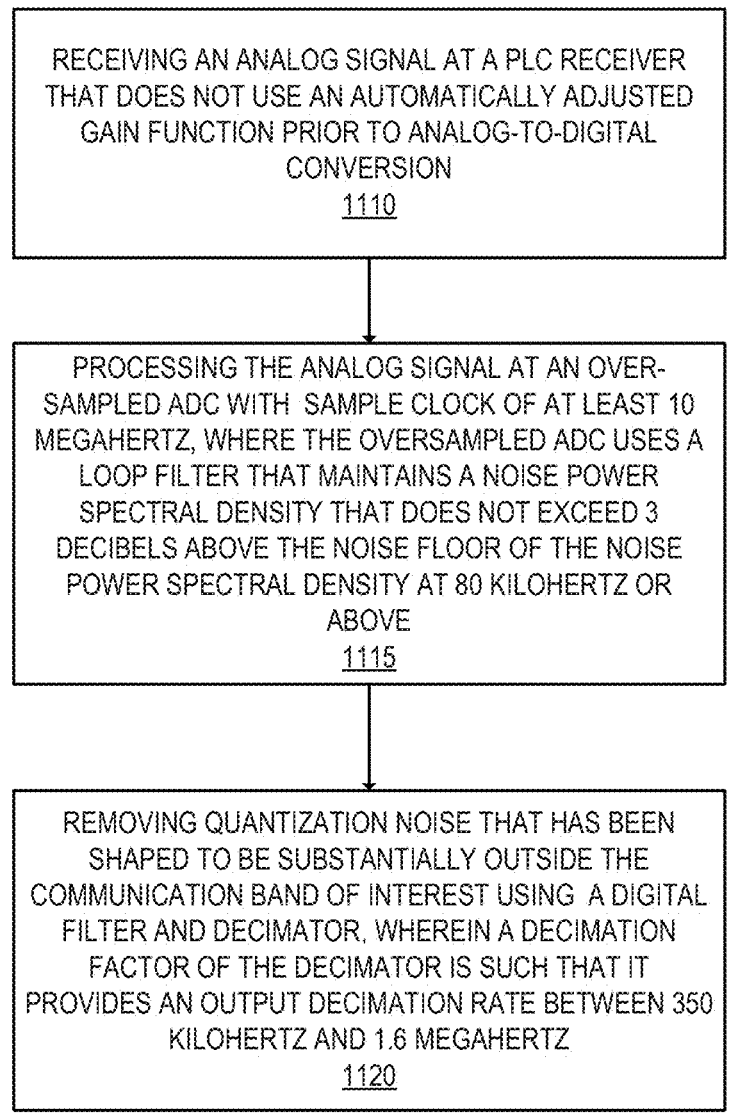
FIG. 11 is a flow diagram illustrating exemplary operations performed by an improved PLC device that is able to receive and process a highly attenuated signal when there is another strong signal present at the receiver in an adjacent frequency band according to one embodiment.

FIG. 11 is a flow diagram illustrating exemplary operations performed by an improved PLC device that is resilient to cross-band interference according to one embodiment. The operations of FIG. 11 will be described with respect to the exemplary embodiment of FIG. 3. However, it should be understood that the operations of FIG. 11 can be performed by embodiments other than those discussed with reference to FIG. 3, and the embodiments discussed with reference to FIG. 3 can perform operations different than those discussed with reference to FIG. 11.

At operation 1110, an analog signal is received at a PLC receiver, where the PLC receiver does not use an automatically adjusted gain function prior to analog-to-digital conversion. For example, the ADC 330 of the PLC device 300 receives the analog signal. In some embodiments, the analog signal may be filtered by a set of one or more filters (e.g., a high-pass filter and/or low-pass filter). Flow then moves to operation 1115.

At operation 1115, the analog signal is processed at an over-sampled ADC (e.g., the ADC 330) that has a sample clock of at least 10 megahertz. The over-sampled ADC uses a loop filter that maintains a noise power spectral density that does not exceed 3 decibels above the minimum noise floor, of the noise power spectral density, at 80 kilohertz or above. Flow then moves to operation 1120.

At operation 1120, the ADC 330 removes quantization noise that has been shaped to be substantially outside the communication band of interest (e.g., A-band, B-band, C-band, and/or D-band) by using the digital filter and decimator 350. In one embodiment, the decimation factor of the decimator is such that it provides an output decimation rate between 350 kilohertz and 1.6 megahertz. The output of the decimator may be connected to a digital signal processor for higher selectivity filtering and other receiver processing.

Figure 12:
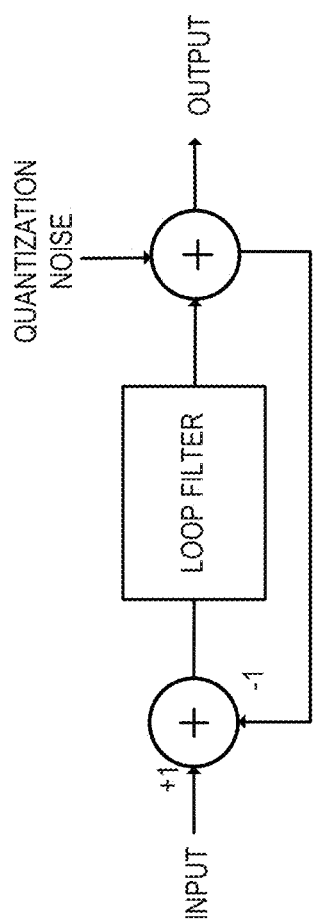
FIG. 12 shows a generic sigma-delta noise shaping model that can be used for loop filter analysis according to one embodiment.

As described above, the loop filter of embodiments of the invention maintains a noise power spectral density that is no more than 3 decibels above the minimum noise floor, of the noise power spectral density, at 80 kilohertz or above. Loop filter analysis may be used to determine how to modify the loop filter transfer function accordingly. Loop filter analysis can be performed using a generic sigma-delta noise shaping model where quantization noise is added at the quantizer location. For example, FIG. 12 shows a generic sigma-delta noise shaping model where quantization noise is added at the quantizer location. The forward transfer function (i.e., frequency response) can be analyzed (Output/Input), without the presence of quantization noise. The loop gain can be analyzed (Output/(Input-Output)) without the presence of quantization noise. The quantization noise transfer function can be analyzed (Output/Noise) with the Input disabled and the Quantization Noise turned on.

Figure 13:
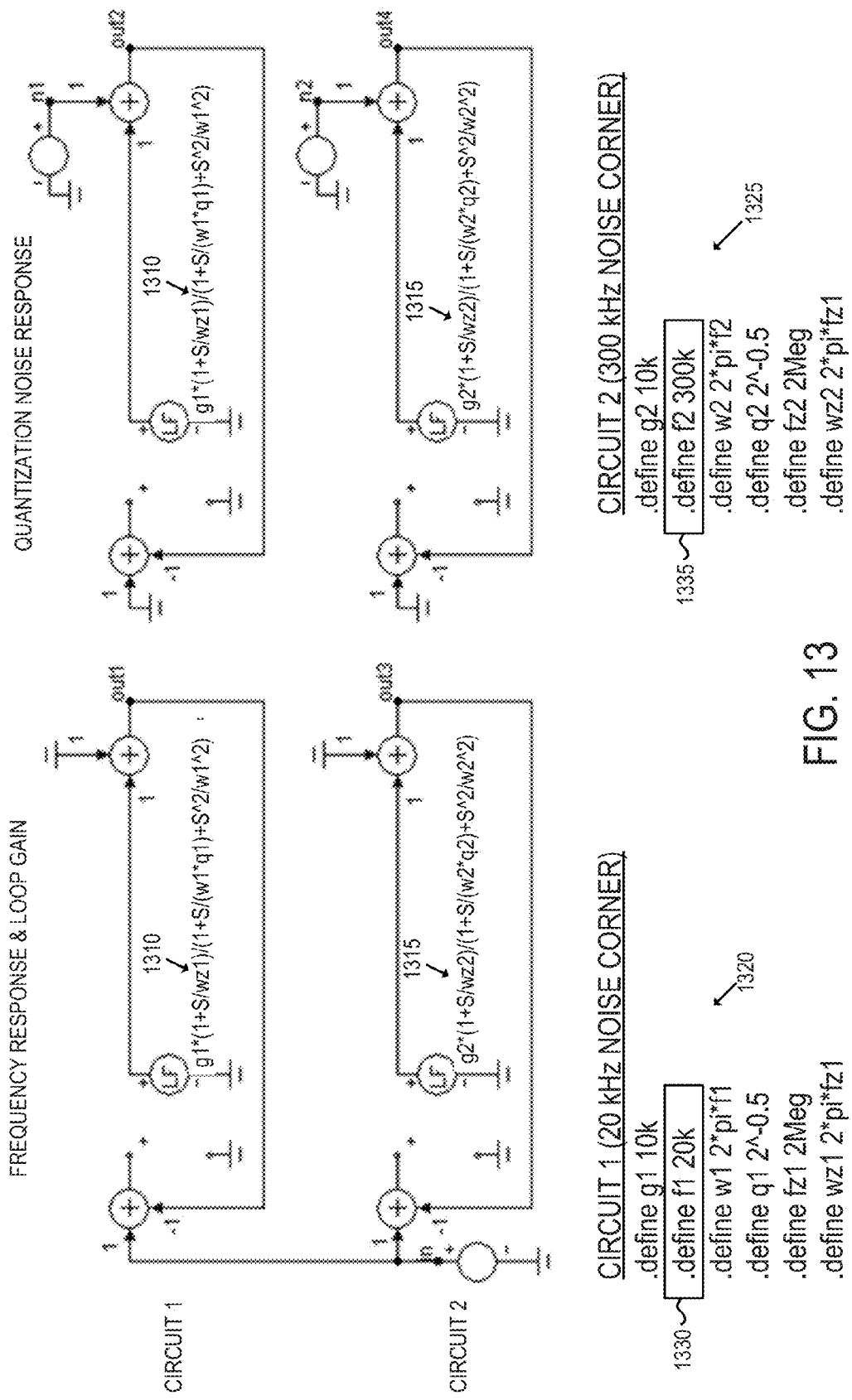
FIG. 13 shows exemplary circuits for loop filter analysis according to one embodiment.
Figure 14:
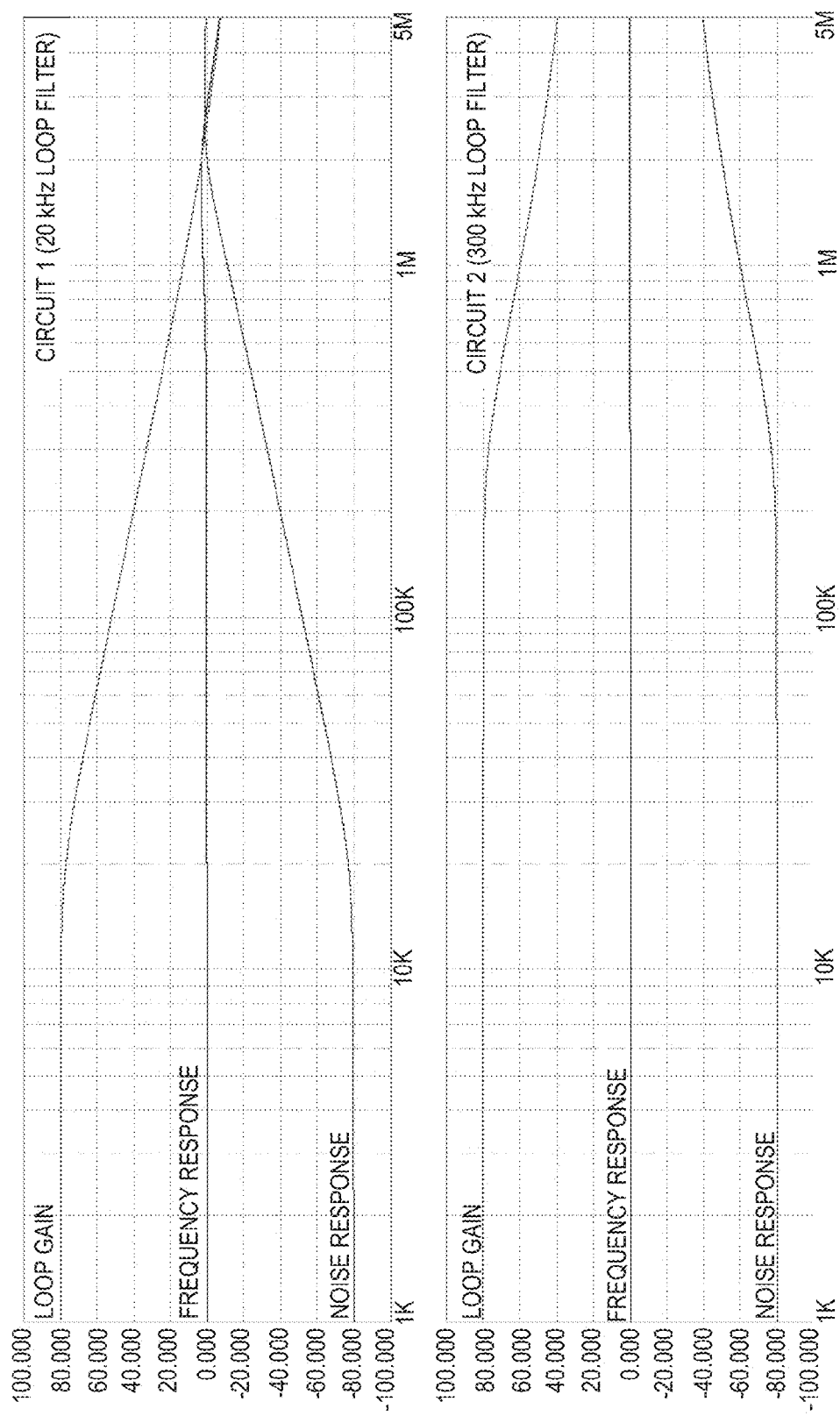
FIG. 14 shows a graph for loop filter analysis according to one embodiment for the exemplary circuits of FIG. 13.

An example of all three responses is shown in FIGS. 13 and 14. FIG. 13 shows circuits 1 and 2 for the frequency response, loop gain, and the quantization noise response according to one embodiment. Circuit 1 has a 20 kilohertz 3 decibel noise corner and circuit 2 has a 300 kilohertz 3 decibel noise corner. The loop filter transfer functions 1310 and 1315 for circuits 1 and 2 respectively are illustrated next to the loop filter (LF). The variable parameters 1320 and 1325 of the loop filter transfer functions 1310 and 1315 respectively are also shown in FIG. 13 (defined by the ".define" statements). By way of example, the parameter that is changed in order to change the loop filter corner from 20 kHz to 300 kHz is represented in the blocks 1330 and 1335. FIG. 14 shows the loop gain, frequency response, and noise response in a graph in a continuous time domain (i.e., S-domain) for circuits 1 and 2 of FIG. 13. Looking at the noise responses in FIG. 14, at the point where the noise rises by 3 decibels corresponds to the parameters shown in blocks 1330 and 1335 of FIG. 13 respectively.

The techniques shown in the figures may be implemented using code and data stored and executed on one or more electronic devices (e.g., a PLC device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus, comprising:
  a power line communication (PLC) device that is configured to communicate on alternating current (AC) power wiring in a frequency range of 9 kilohertz to 500 kilohertz and does not use automatic gain control (AGC) functionality prior to analog to digital conversion, the PLC device including:
    an over-sampled analog-to-digital converter (ADC) with a sample clock of at least 10 megahertz and includes:
      a loop filter that maintains a noise power spectral density that does not exceed 3 decibels above a minimum noise floor, of the noise power spectral density, at 80 kilohertz or above, and
      a digital filter and decimator configured to remove quantization noise, wherein a decimation factor of the decimator is such that it provides an output decimation rate between 350 kilohertz and 1.6 megahertz.

2. The apparatus of claim 1, wherein the PLC device further includes:
  a digital signal processing (DSP) processor coupled with an output of the over-sampled ADC, wherein the DSP processor has a 17 to 28 input bit width.

3. The apparatus of claim 1, wherein the PLC device is compliant with one or more of the following standards:
  European Committee for Electrotechnical Standardization (CENELEC) standard EN 50065-1;
  International Telecommunication Union Telecommunication Standardization Sector (ITU-T) G.9902;
  ITU-T G.9903;
  ITU-T G.9904;
  International Organization for Standardization/International Electrotechnical Commission (ISO/IEC) 14908-3; and Institute of Electrical and Electronics Engineers (IEEE) P1901.2/D0.07.00.

4. The apparatus of claim 1, wherein the over-sampled ADC includes a sigma-delta modulator.

5. The apparatus of claim 4, wherein the sigma-delta modulator is a multi-stage noise shaping (MASH) structure.

6. The apparatus of claim 4, wherein the sigma-delta modulator is a $3^{rd}$ order sigma-delta modulator.

7. The apparatus of claim 1, wherein the decimation factor is programmable.

8. The apparatus of claim 1, wherein the PLC device further includes:
 a high-pass filter configured to remove AC mains voltage; and
 a low-pass filter configured to prevent aliasing.

9. A method in a power line communications (PLC) receiver that communicates on alternating current (AC) power wiring in a frequency range of 9 kilohertz to 500 kilohertz, comprising:
 receiving an analog signal at the PLC receiver, wherein the PLC receiver does not use an automatically adjusted gain function prior to analog-to-digital conversion;
 processing the analog signal at an over-sampled analog-to-digital converter (ADC) with a sample clock of at least 10 megahertz, wherein the over-sampled ADC uses a loop filter that maintains a noise power spectral density that does not exceed 3 decibels above a minimum noise floor, of the noise power spectral density, at 80 kilohertz or above; and
 removing quantization noise using a digital filter and decimator, wherein a decimation factor of the decimator is such that it provides an output decimation rate between 350 kilohertz and 1.6 megahertz.

10. The method of claim 9, further comprising:
 processing the output of the digital filter and decimator at a digital signal processor that is coupled to the over-sampled ADC, wherein the digital signal processor has a 17 to 28 input bit width.

11. The method of claim 9, wherein the PLC device is compliant with one or more of the following standards:
 European Committee for Electrotechnical Standardization (CENELEC) standard EN 50065-1;
 International Telecommunication Union Telecommunication Standardization Sector (ITU-T) G.9902;
 ITU-T G.9903;
 ITU-T G.9904;
 International Organization for Standardization/International Electrotechnical Commission (ISO/IEC) 14908-3; and
 Institute of Electrical and Electronics Engineers (IEEE) P1901.2/D0.07.00.

12. The method of claim 9, wherein the over-sampled ADC includes a sigma-delta modulator.

13. The method of claim 12, wherein the sigma-delta modulator is a multi-stage noise shaping (MASH) structure.

14. The method of claim 12, wherein the sigma-delta modulator is a $3^{rd}$ order sigma-delta modulator.

15. The method of claim 9, wherein the decimation factor is programmable.

16. The method of claim 9, further comprising:
 prior to processing the analog signal at the over-sampled ADC, performing the following:
  removing AC mains voltage from the analog signal using a high-pass filter, and
  preventing aliasing using a low-pass filter.

17. An apparatus, comprising:
 a power line communication (PLC) device that is configured to communicate on alternating current (AC) power wiring in a frequency range of 9 kilohertz to 500 kilohertz and does not use automatic gain control (AGC) functionality prior to analog to digital conversion, the PLC device including:
  an over-sampled analog-to-digital converter (ADC) with a sample clock of at least 10 megahertz and includes:
  a sigma-delta modulator that has a loop filter that maintains a noise power spectral density that does not exceed 3 decibels above a minimum noise floor, of the noise power spectral density, at 80 kilohertz or above, and
  a digital filter and decimator configured to remove quantization noise,
   wherein a decimation factor of the decimator is such that it provides an output decimation rate between 350 kilohertz and 1.6 megahertz; and
 wherein the PLC device is compliant with one or more of the following standards:
  European Committee for Electrotechnical Standardization (CENELEC) standard EN 50065-1,
  International Telecommunication Union Telecommunication Standardization Sector (ITU-T) G.9902,
  ITU-T G.9903,
  ITU-T G.9904,
  International Organization for Standardization/International Electrotechnical Commission (ISO/IEC) 14908-3, and
  Institute of Electrical and Electronics Engineers (IEEE) P1901.2/D0.07.00.

18. The apparatus of claim 17, wherein the sigma-delta modulator is a multi-stage noise shaping (MASH) structure.

19. The apparatus of claim 17, wherein the sigma-delta modulator is a $3^{rd}$ order sigma-delta modulator.

20. The apparatus of claim 17, wherein the decimation factor is programmable.

* * * * *